United States Patent
Baiden

(10) Patent No.: US 10,443,382 B2
(45) Date of Patent: Oct. 15, 2019

(54) SYSTEM AND METHOD FOR HANG-UP ASSESSMENT AND REMOVAL

(71) Applicant: Penguin Automated Systems Inc., Naughton (CA)

(72) Inventor: Gregory Baiden, Lively (CA)

(73) Assignee: Penguin Automated Systems, Inc., Naughton, Ontario (CA)

( * ) Notice: Subject to any disclaimer, the term of this patent is extended or adjusted under 35 U.S.C. 154(b) by 105 days.

(21) Appl. No.: 15/121,813

(22) PCT Filed: Mar. 2, 2015

(86) PCT No.: PCT/CA2015/000126
§ 371 (c)(1),
(2) Date: Aug. 26, 2016

(87) PCT Pub. No.: WO2015/127545
PCT Pub. Date: Sep. 3, 2015

(65) Prior Publication Data
US 2017/0067341 A1 Mar. 9, 2017

Related U.S. Application Data

(60) Provisional application No. 61/946,400, filed on Feb. 28, 2014, provisional application No. 62/006,120, filed on May 31, 2014.

(51) Int. Cl.
*E21F 17/00* (2006.01)
*F42D 3/04* (2006.01)
(Continued)

(52) U.S. Cl.
CPC .............. *E21F 17/00* (2013.01); *B25J 11/00* (2013.01); *E21B 7/025* (2013.01); *E21C 37/00* (2013.01);
(Continued)

(58) Field of Classification Search
CPC ........ E21F 13/006; E21F 17/00; E21C 41/22; E21C 35/24; E21C 41/16; E21B 7/023;
(Continued)

(56) References Cited

U.S. PATENT DOCUMENTS 4,172,615 A * 10/1979 Hakes ................... E21D 20/003
173/159
4,508,035 A * 4/1985 Mashimo ................ E21B 7/022
102/312
(Continued)

FOREIGN PATENT DOCUMENTS

CA 2043926 12/1992
CA 2018540 7/1993
(Continued)

OTHER PUBLICATIONS

SB-9 & SB-12 Secondary Breaker by Mining Life, made public in 2012, accessed on Jun. 26, 2015; URL: http://mininglifeonline.net/equipment_details_394.html.
(Continued)

*Primary Examiner* — David J Bagnell
*Assistant Examiner* — Michael A Goodwin
(74) *Attorney, Agent, or Firm* — Coats & Bennett PLLC

(57) ABSTRACT

A system and method for relieving hang-ups, comprising a mobile command vehicle operative to transport a robotic vehicle to a control location remote from a hang-up location; the robotic vehicle operative to advance from the control location to the hang-up location, scan the hang-up location, transmit scanning information to the command vehicle, and receive positioning commands to position the robotic vehicle for drilling into the hang-up location, implant an explosive, and withdraw.

20 Claims, 11 Drawing Sheets

(51) Int. Cl.
*E21B 7/02* (2006.01)
*E21C 37/16* (2006.01)
*B25J 11/00* (2006.01)
*E21C 37/00* (2006.01)
*E21C 35/24* (2006.01)

(52) U.S. Cl.
CPC ............... *E21C 37/16* (2013.01); *F42D 3/04* (2013.01); *E21C 35/24* (2013.01)

(58) Field of Classification Search
CPC .... E21B 7/025; F42D 3/00; F42D 3/04; B25J 5/00; B25J 5/007
See application file for complete search history.

(56) References Cited

U.S. PATENT DOCUMENTS

| | | | | |
|---|---|---|---|---|
| 4,708,395 A | * | 11/1987 | Petry | E21C 45/00 299/1.05 |
| 6,318,272 B1 | * | 11/2001 | Mey | F42B 3/00 102/302 |
| 6,672,673 B1 | | 1/2004 | Miller et al. | |
| 2002/0121213 A1 | * | 9/2002 | Micke | F42D 3/00 102/473 |
| 2003/0052529 A1 | * | 3/2003 | Hakkinen | E21C 35/24 299/1.05 |
| 2010/0270076 A1 | * | 10/2010 | Ahola | E21B 7/025 175/2 |
| 2013/0145950 A1 | * | 6/2013 | Leppanen | F42D 1/22 102/306 |
| 2016/0123146 A1 | * | 5/2016 | Makela | G05D 1/024 701/50 |
| 2017/0314331 A1 | * | 11/2017 | McCracken | E21B 7/025 |

FOREIGN PATENT DOCUMENTS

| | | |
|---|---|---|
| CA | 2239823 | 6/1997 |
| CA | 2188336 | 4/1998 |
| WO | 2012055043 A1 | 5/2012 |

OTHER PUBLICATIONS

SB-9 & SB-12 Secondary Breaker by MacLean Engineering, made public on Jan. 18, 2010, accessed on Jun. 26, 2015; URL: http://www.macleanengineering.com/Products/Ore_Flow_Facilitation/SB.php.

* cited by examiner

SYSTEM AND METHOD FOR HANG-UP ASSESSMENT AND REMOVAL

TECHNICAL FIELD

This application relates to robotic tools for resolving mining or construction roof falls. In particular, aspects of this application relates to a robotic tool for resolving blockages in drawbells used for block cave mining.

TECHNICAL BACKGROUND

In mining and construction/demolition applications, a problem may arise when unstable material is caught in a suspended location. Efforts to release the material from the suspended location can be difficult, and place workers in a hazardous situation.

Block cave mining is a particular type of mining where ore is broken and directed to fall through vertical passages (drawbells), for collection and processing. It is fairly routine in block cave mining for the broken ore to become trapped in the drawbells in a suspended location. Accordingly miners in block cave mining are regularly faced with the problem for resolving roof falls.

The present application is described in terms of block cave mining as a suitable application, however it is understand that the systems and methods described within are applicable to other applications that require resolving unstable material caught in a suspended location.

In the field of block cave mining, several methods have been used for resolving material caught in a suspended location. These methods include: (a) manual methods inserting explosives, (b) mechanical prying techniques and (c) launching mortar rounds. Each of these methods involves significant risks and limited success. In particular, the manual methods typically require a worker to be located in an unsafe location near, i.e. above or below, the suspended material. Sudden release of the material placing the workers at physical risk. The remote method of launching mortar rounds brings a number of risks to bear, and requires a relatively large amount of explosives since the round impacts the surface of the material.

There is a need for an improved system and method for resolving material caught in suspended locations, including "hang-ups" occurring in block cave mining.

BRIEF DESCRIPTION OF THE DRAWINGS

In drawings which illustrate by way of example only embodiments of the present disclosure, in which like reference numerals describe similar items throughout the various figures.

DETAILED DESCRIPTION

Figure 1:
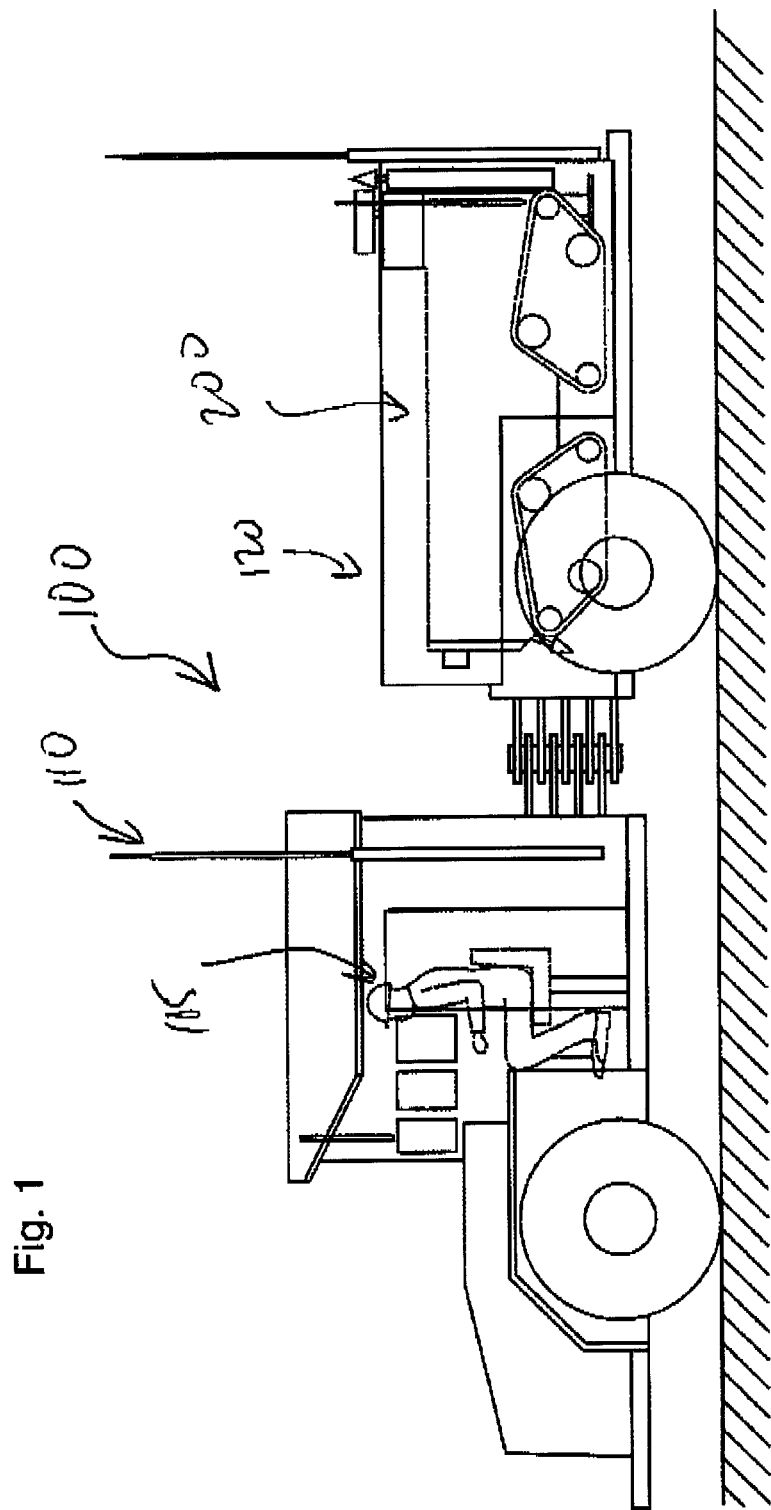
FIG. 1 is a side view of an embodiment of a mobile command vehicle.

Block cave mining typically involves the excavation of one or more tunnels or shafts from the surface to a desired location below the ore body. The tunnels or shafts provide access to the ore body and allow ore to be removed after mining. Various levels are developed. An undercut level is developed below the ore body by drilling and blasting tunnels. Below the undercut level, an extraction level is developed, also by drilling and blasting tunnels. The ore body directly above the undercut level is then blasted in selected places, which in turn causes a portion of the ore body to fracture.

The ore fragments fall under gravity, gathering at draw points for collection and later processing. Meantime, the caving process gradually propagates upward and further into the ore body. Between the undercut and extraction levels, a series of drawbells are developed. The drawbells, typically conical in shape, form passageways between the undercut and extraction levels. The fractured ore falls through the drawbells into the extraction level to be removed from the mine. As ore falls through the drawbells, the ore body will continue to crack under its own weight and fall through the drawbells to the extraction level. Fragments that are too large can block a draw point portal. The culprit can be a single boulder or a stringed arch of smaller boulders. Blockcaving miners call such blockages of suspended material "hang-ups".

It is desirable to provide a system and method for relieving hang-ups, that reduces the exposure of workers to the hazards of releasing suspended material. In an aspect, the system involves the delivery of a remotely-operated robotic vehicle that is operative to advance from a relatively safe "base" location into a hazardous location in close proximity to the suspended material. The robotic vehicle is then operative, under remote control, to image the suspended material, drill at least one incretion hole into one or more selected pieces of material, and insert at least one explosive charge into each of the at least one insertion holes.

In an aspect, the robotic vehicle may be delivered by a mobile command vehicle. The mobile command vehicle being driven by an operator to the base location. At the base location, the operator may operate the robotic vehicle from a command console located inside the mobile command vehicle. The mobile command vehicle may in communication with the robotic vehicle over a wired or wireless communications link.

In an aspect, the robotic vehicle may be further operative to provide visual or other sensor feedback of the hang-up location to the mobile command vehicle to allow for assessment by the operator before planning an explosive implantation routine.

In an aspect, the visual or other sensor feedback may further be transmitted (eg. via a transmitter or, when also receiving, a transceiver) to an assessment location, for instance at a mine control center, to allow for central review, appraisal, and recommendation of the explosive implantation routine.

In an aspect, the robotic vehicle may receive local positioning commands (i.e. data sent to control the robotic vehicle movements, or control data) from the mobile command vehicle (eg. via a transceiver), which in turn may receive commands from the mine control centre, for instance over a mine-wide communications link.

In aspect, a geo-spatially referenced database of underground hang-up situations may be provided, for example to categorize types of hang-ups that may be encountered. Users of this information database may include, for instance, the operator in the mobile command vehicle, the blasting engineer and ultimately mine engineering personnel for assessment of the explosive implantation routine.

Prior to hang-up assessment and removal, the possible operating modes for the hang up robot's arm (scan, plan, drill, charge placement) can be assessed for the specific nature and extent of the hang-up in need of removal. This assessment can be compared to the database management system of hang-up removal scenarios to optimize the system for the particular hang-up. Each time the hang-up assessment and removal robotic system is deployed, it will encounter a different scenario with multiple variables. Each of these scenarios is characterized and categorized based on the hang-up, and the hang-up removal technique is recorded. This information is added to the database management system for optimization of the system for future hang-ups.

Referring to FIG. 1, an implementation of a mobile command vehicle 100 is illustrated. The mobile command vehicle 100 may be operative autonomously, under tele-operation, or under local control by an operator 105. The mobile command vehicle 100 operative to transport a robotic vehicle 200 that is operative to remotely assess and interact with a hang-up comprising suspended material. In the implementation illustrated, the mobile command vehicle 100 comprises an articulated vehicle with a rear cargo portion suitable for transporting the robotic vehicle 200. In an aspect, the mobile command vehicle 100 may comprise a truck and trailer combination, the trailer being operative to transport the robotic vehicle 200.

The mobile command vehicle 100 may comprise a control console, for instance including one or more monitors and at least one controller for controlling the robotic vehicle 200.

In one embodiment, the control cabin of the mobile command vehicle 100 has the dual purpose of being the tele-command control cabin for controlling the robotic vehicle 200 and to function as the vehicle cabin for controlling the mobile command vehicle 100. In an embodiment, the vehicle driver, or in some embodiments the tele-operator, drives the mobile command vehicle 100 to a safe distance from the hang-up while remaining in network control of the robotic vehicle 200 as it addresses the hang-up. In other embodiments, the control cabin may be separate from the vehicle cabin. For example, the control cabin may be directly behind the vehicle cabin or, in other embodiments, the control cab may located be on a trailer apart from the vehicle cabin. In embodiments where the cabin has a dual purpose, the operator switches to robot control once the mobile command vehicle 100 is parked.

The cabin of the mobile command vehicle 100 may also include computers, networking equipment, power supplies and any other controls deemed necessary. In addition to operation of the robotic vehicle 200, the mobile command vehicle 100 may be operative to control the detonation of the explosives placed by the robotic vehicle 200.

One function of the robotic vehicle 200 is to gather information by remote inspection of the hang-up for a blasting engineer, located for example in an office a distance from the hang-up, to assess the hang-up and select the target for location of the drill hole and the explosives for attempted removal of the hang-up. Preferably, a broadband communication network is available in the mine for the transmission of this information to the mine control centre for central review and assessment. In mine environments where a broadband network is not available or yet to be installed, the operator in the control cabin may be called upon to make the decision about explosives placement without input from the mine control centre.

The trailer or cargo component 120 of the mobile command vehicle 100 preferably consists of a flat deck that tilts to allow the robotic vehicle 200 to exit and enter the trailer. In an aspect, the machine end of the trailer 120 houses a charging system that supports charging of the robotic vehicle 200 when it is parked on the trailer 120. Storage compartments may be included on the sides of the trailer for storage of drill bits and explosive charges for use by the robotic vehicle 200. In one embodiment, the machine end of the trailer also includes a blasting box for igniting the charge using the leg wires that the robotic vehicle 200 returns to the trailer once the charge is set.

The mobile command vehicle 100 may include an antenna 110 for communicating with the robotic vehicle 200.

Figure 2:
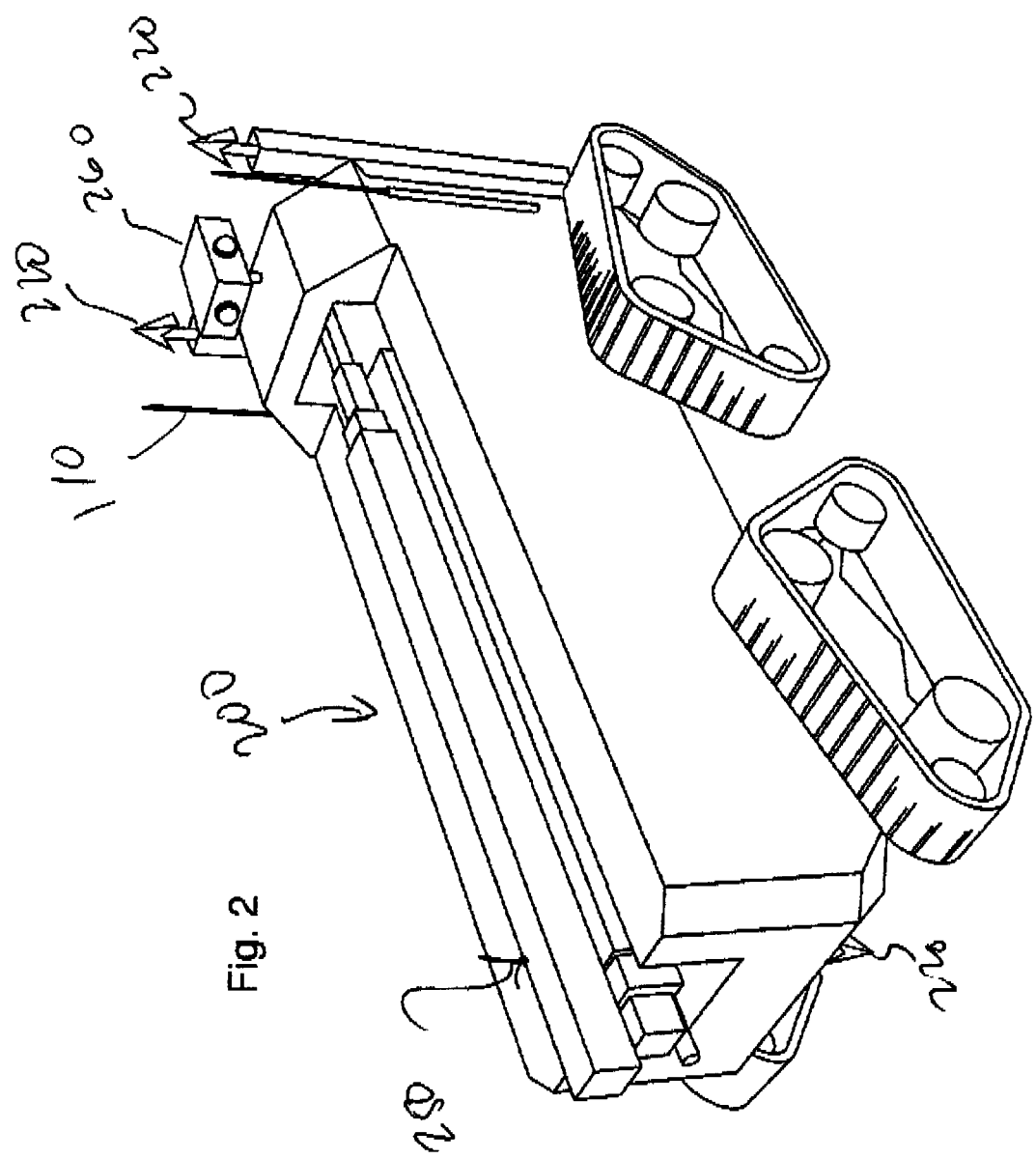
FIG. 2 is an isometric view of an embodiment of a robotic vehicle.

FIG. 2 illustrates an embodiment of the robotic vehicle 200. In the embodiment, the robotic vehicle 200, comprises a tracked vehicle that may include one or more antennas 110 for communication with the mobile command vehicle 100. The robotic vehicle 200 may include one or more cameras 260 mounted to provide visual guidance of the robotic vehicle 200 for operator control. One or more stingers 220 may also be included at the back of the robot. The stingers 220 being pneumatic or hydraulically operated braces that may be extended to support the robotic vehicle 200 when it is place for operation. A robotic arm 250 is provided. In the view of FIG. 2, the robotic arm is illustrated in a retracted position.

The body of the robotic vehicle 200 may be watertight and have protection against rock falls to ensure the high-value internal components remain recoverable. The propulsion system for the robotic vehicle 200 may consist of an electric hydraulic power plant that drives independent track suspensions to allow for positioning of the robot and potentially difficult terrain.

The power system on board the robotic vehicle 200 may consist of a series of batteries with sufficient power to operate the robot for an eight hour shift. Each time the robot returns to the carrier machine, it may be automatically charged. Alternatively, the robotic vehicle 200 may rely upon an internal combustion engine, or other power means.

The computer and electronic control system of the robotic vehicle 200 supports the operation of the arms and end-effectors, the propulsion system, power management system, imaging system and telecommunications.

In a preferred embodiment, the robotic vehicle 200 includes an accurate geospatial positioning system with a position location and navigation system specifically designed for subsurface work. In this embodiment, the robotic vehicle 200 will be advanced into the blasting site to do a 3D survey of the hang-up, and communicate the data (including the surveyed or scanned data) to the operator, and/or mine blasting engineers, to do the analysis to select the target to place the explosive. Once the target is known, the robot will move to a location where it can park, extend the robotic arm 250, drill and insert the explosive safely. In this embodiment, the robot can be driven by an operator or by an auto-guided system. Once the robot reaches the parking location it will extend the robotic arm 250 for drilling, insert the explosive into the drilled hole, and retreat after the explosive is in place. Once the robot is in a safe location, the explosive can then be triggered.

This embodiment includes a robot with a known absolute position or a known relative position with respect to UTM coordinate or mine coordinate system (i.e. positional data) throughout the process. An accurate INS system, including for example the Talon™ (Honeywell™), is preferred for this embodiment. A cavity monitoring system (or CMS), including for example laser SICK™ scanners, is preferred for the 3D surveying and modelling of the site of interest. In addition, rotary encoders and linear potentiometers may be used to provide valuable feedback parameters for the robotic arm 250 while extended. Stereo vision cameras for driving the robot and for visualizing the ceiling (target for deploying explosive) are also preferred. Additionally, distance measurement of how far the end-effectors of the boom are away from the ceiling once the boom is extended may be used to prevent unwanted collision that may damage the equipment and delay the operation. Throughout the process, the operator and the mining engineers benefit from full vision of the surroundings, so additional sensors, cameras, and RF cameras may also be used.

As the robotic vehicle 200 approaches the target, it will do a 3D scan of the environment. The data is sent to the mining engineers to analyze and find the target location to drill the blockage or deploy the explosive. Once a target is identified, the robot moves to a position where it can safely park. The operator then uses the stereo vision cameras to see while extending the robotic arm 250 to reach the target with its end-effectors.

In another embodiment, the robotic vehicle 200 is moved to within a reasonable range of the hang-up location. Software based on simultaneous localization and mapping (or SLAM) techniques using the kinematic characteristic of the boom to find a location in the 3D workspace for the robot to park and to extend the robotic arm 250 to reach the target autonomously with an option for guided operation. The software may also assist an operator if the robot has not been properly aligned to the target, for example when drilling a hole for explosives.

In an aspect, the robotic vehicle 200 may include automated positioning software, for instance based the concept of "finite state machine", where all the necessary steps are carried out sequentially to safely position the robotic vehicle 200. After advancing the robot, scanning the location, and defining a blasting point, the robotic vehicle 200 may be operative to move as necessary to locate itself with the necessary clearance to extend the robotic arm 250, drill and place the explosive. Once the explosive is deployed, the robot will retreat and move in a safe location before the explosive is triggered. In this particular embodiment, minimal to no human interaction may be required from the operator.

Figure 3:
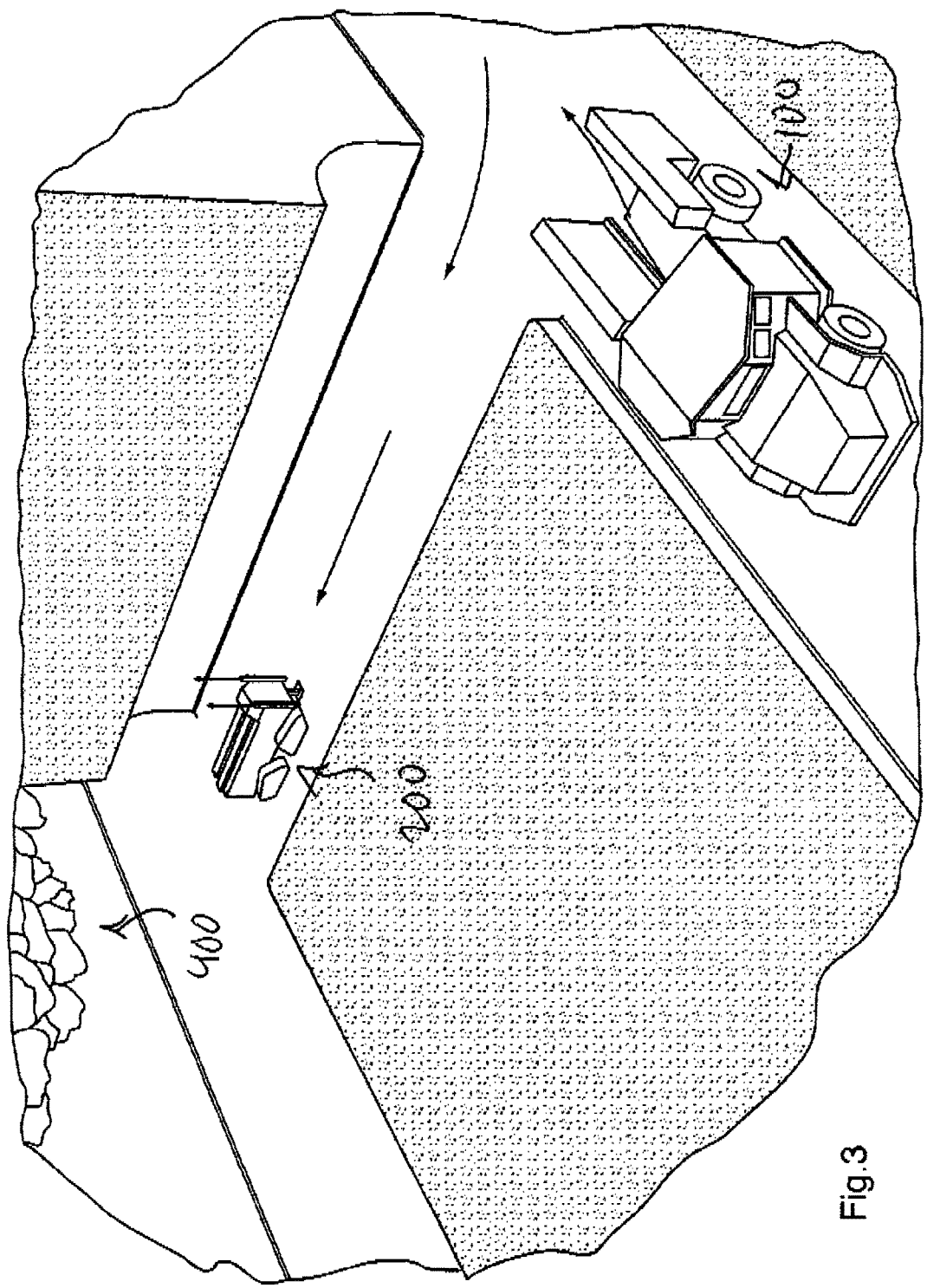
FIG. 3 is an isometric cut-away view of the robotic vehicle in position under a hang-up.
Figure 4:
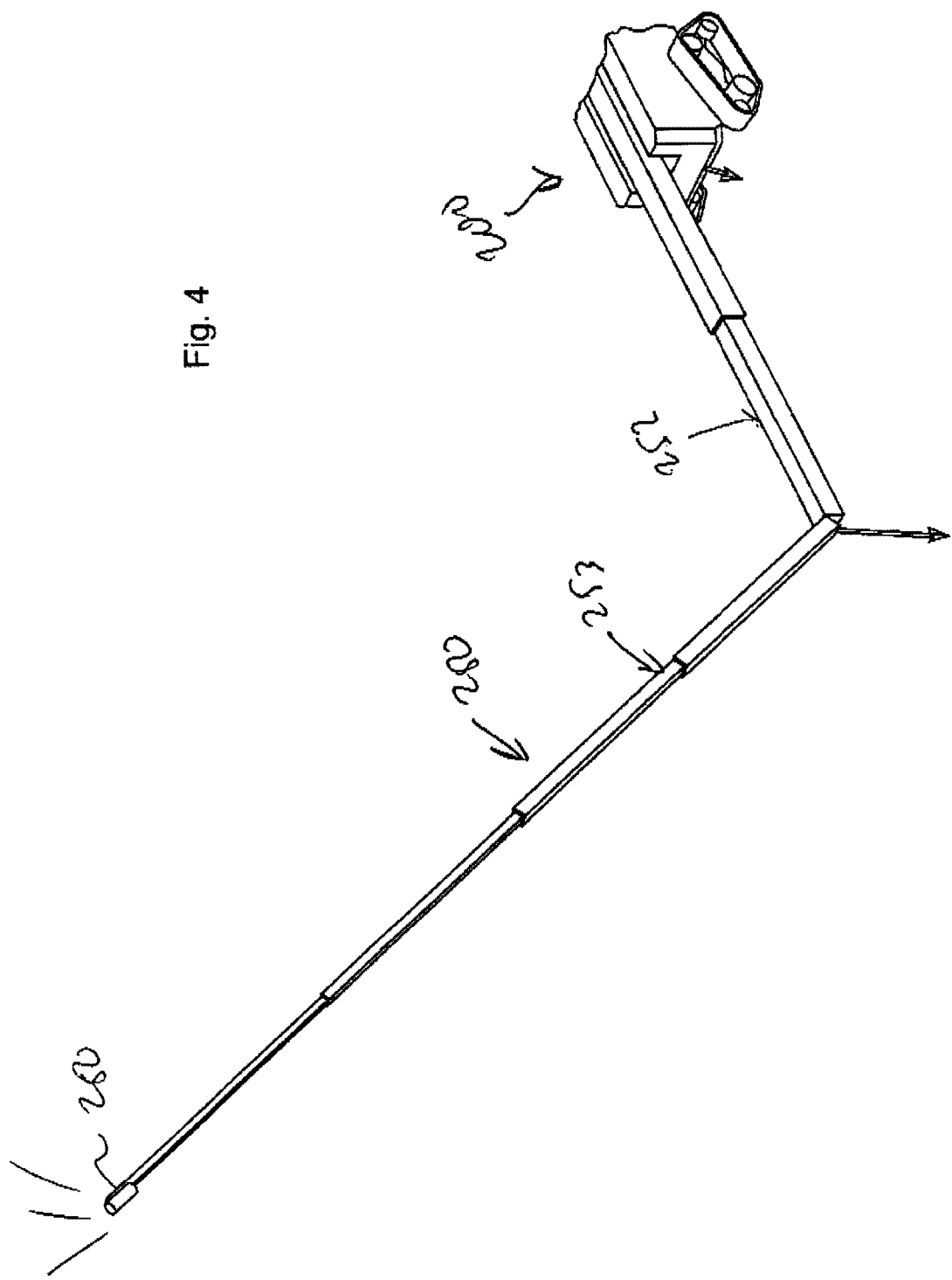
FIG. 4 is an isometric view of the robotic vehicle with the robotic arm extended.

In an aspect, the robotic vehicle 200 may be fully teleoperated, with the operator providing the necessary move Referring to FIG. 3, the robotic vehicle 200 may be deployed from the mobile command vehicle 100 and advanced to a position near the hang-up 400. The robotic arm 250 may be extended, as shown in FIG. 4, in order to perform a 3D scan and modelling of the blasting site using scanners 260 located at the end of the robotic arm 250. A full 360-degree scan of the environment is beneficial, but the scope of the scan will vary depending on the scanner 260 being used (e.g. radar or laser). With the known absolute coordinates of the robotic vehicle 200 in terms of UTM or relative coordinates, the blasting engineers select a target point (x,y,z) where the explosive should be deployed. With the target point chosen, using inverse kinematics, a point in the 3D workspace is determined where the robot should be positioned to guarantee that the blasting point is reachable with the end-effectors of the robotic arm 250.

Figure 15:
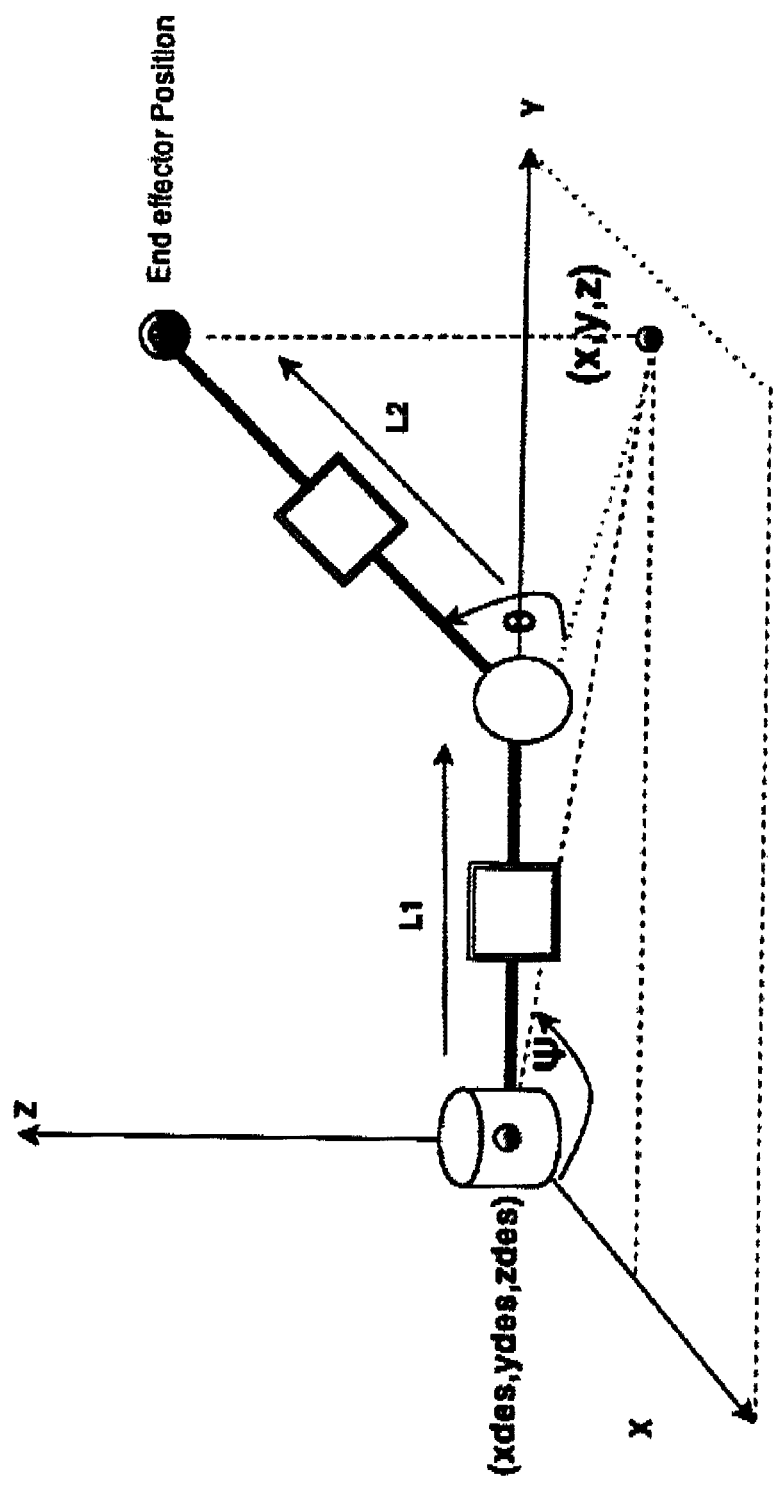
FIG. 15 is a schematic diagram for the guidance algorithm input showing the position of the end effector relative to the robotic vehicle.

Given that the target point is known and with the assumption that a 90-degree angles θ between the lower arm 252 and the upper arm 253 is the preferred angle in some situations, as shown in FIG. 15, it is possible to come up with an infinite number of solutions of where to park the robot. In other words, there are all infinite number of possible points for the robot to park and still be able to reach the target with the boom extended. From these infinite set of solutions, the optimal corresponding point to park the robot is obtained by solving for L1 and L2 as shown in FIG. 15. A preferred solution is to pick a location that is nearest to the current robot location.

If the point to park the robot calculated by the system is not at the same point where the robotic vehicle 200 is currently parked, the auto guidance system will operate the robotic vehicle 200 to new point while doing obstacle avoidance and path planning dynamically. In this embodiment, the robotic vehicle 200 is enabled to do path planning based on the full 360-degree scan of the environment that was already performed. A path planner may be used to drive the robotic vehicle 200 to the new location, as desired. The method used to calculate the point to park the robotic vehicle 200 remains the same, as it still utilizes the kinematic characteristics of the robotic arm 250. In general, the inverse kinematic will find a point, where the robotic vehicle 200 will park, extend the robotic arm 250, drill the hole, place the explosive and retreat. This is all done in the guidance algorithm to calculate the optimal angle θ of the joint, the lengths $L^1$ and $L^2$, and find a point where the robotic vehicle 200 can park.

In general, a 90-degree angle θ is the optimal angle because then the force acting on the robotic arm 250 will be directed to the ground; which is counterbalanced by the stingers, as shown in FIG. 4. However, in some situation, the blast location is not perfectly flat as it can be slanted at an angle. Then, the most optimal angle between the robotic arm 250 may not be 90-degrees. To solve this problem, the 3D data scans are used to generate a set of vectors that define the target. Then, the operator or software can adjust the robotic arm 250 angle to compensate for the angle offset. This approach guarantees that the drill will always be approximately perpendicular to the drilling location.

In an aspect, the scanners 250 may be located on the lower arm 252. In this aspect, the robotic arm 250 may be extended from the robotic vehicle 200 for scanning the area before extending the upper arm 253. In an aspect, shown in FIG. 4, the scanners 250 are located on the upper arm 253.

Figure 5:
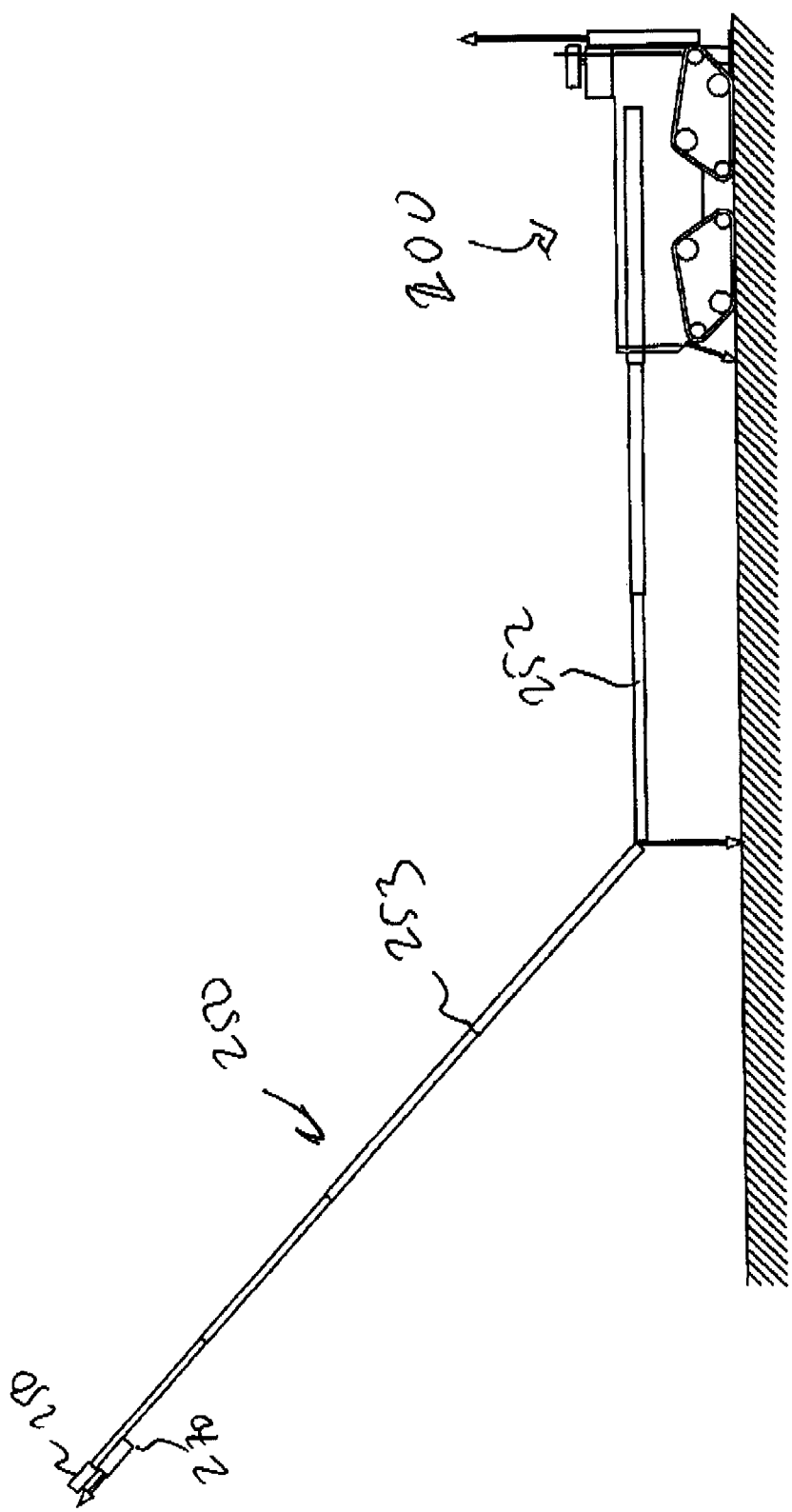
FIG. 5 is a side view of the robotic vehicle with the robotic arm extended.

Referring to FIG. 5, a side view of the robotic vehicle with the robotic arm 250 extended is illustrated. In the view, an effector 270 is co-located with the scanner 250 at the end of the upper arm 253.

Figure 6:
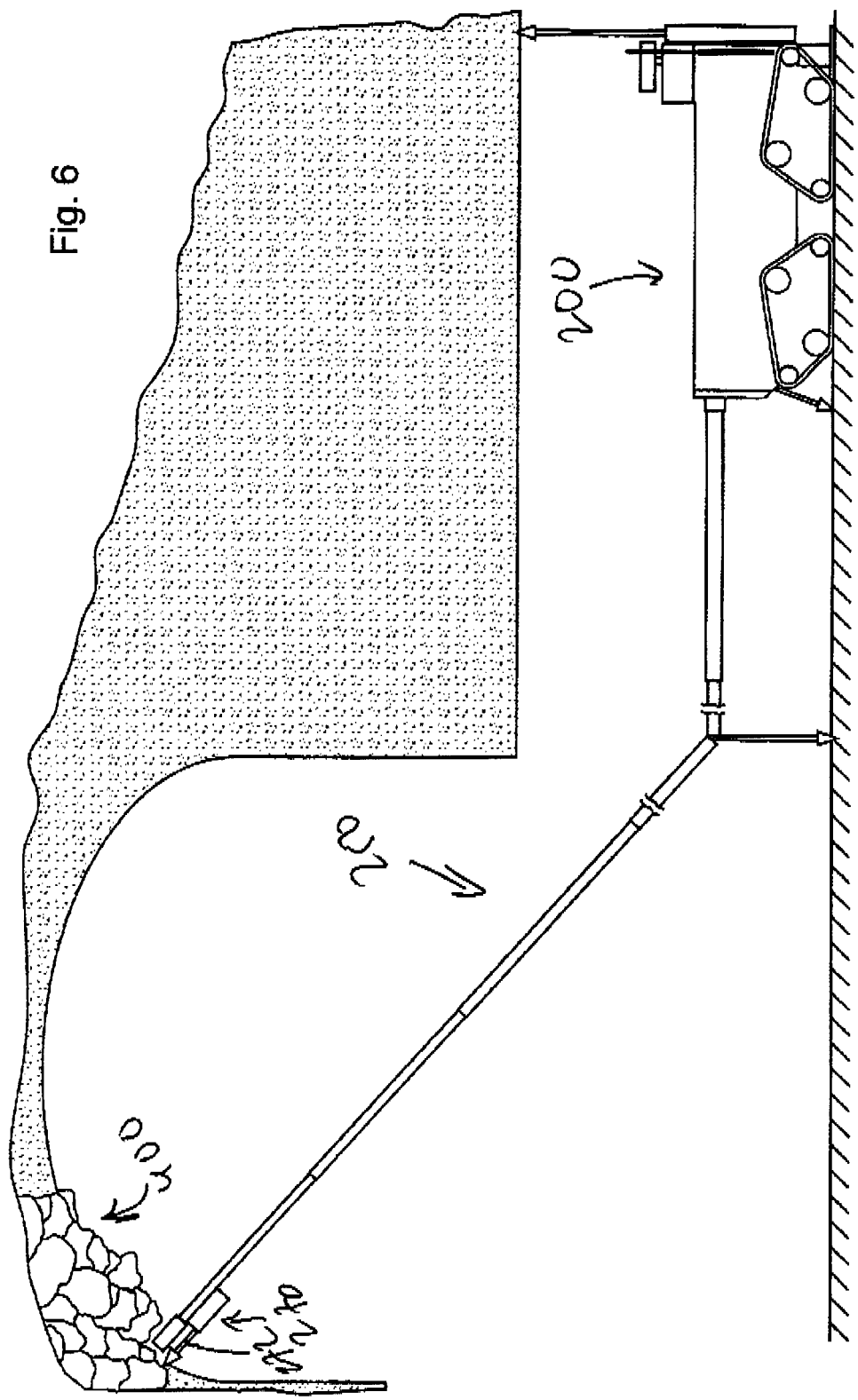
FIG. 6 is a side view of the robotic vehicle with the robotic arm extended in position at a hang-up.
Figure 7:
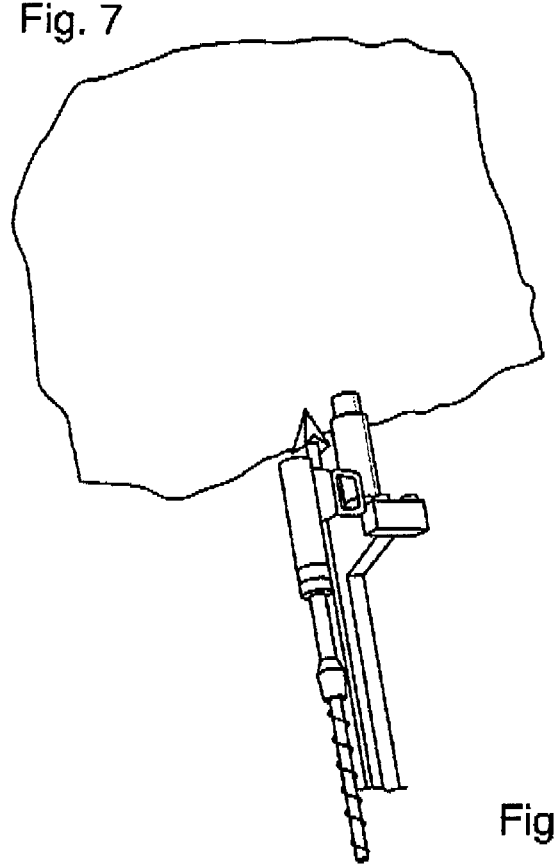
FIG. 7 is a view of a sequence of a drilling operation.
Figure 8:
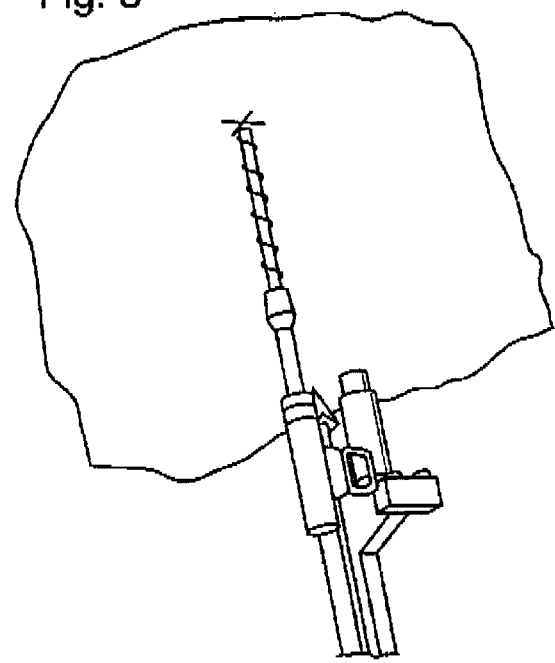
FIG. 8 is a view of a sequence of a drilling operation.
Figure 9:
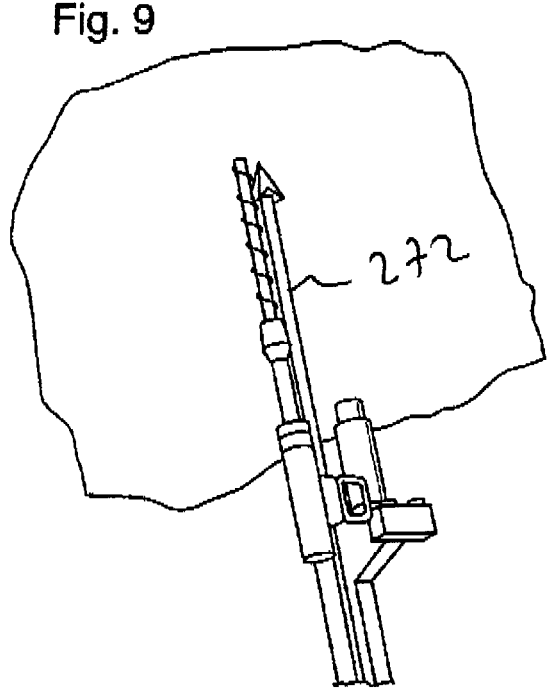
FIG. 9 is a view of a sequence of a drilling operation.
Figure 10:
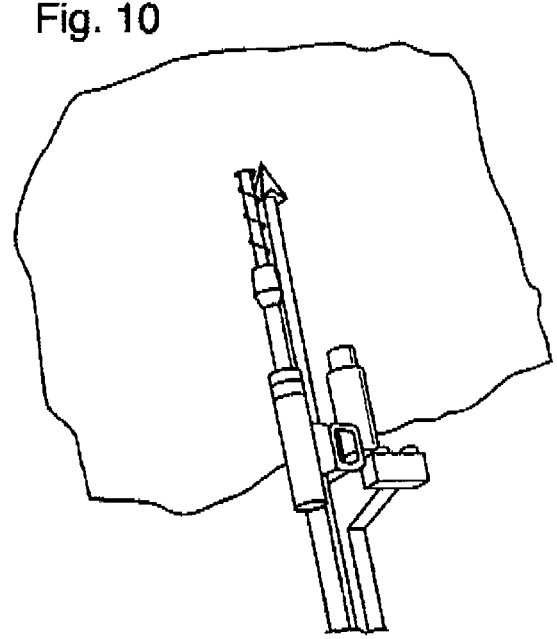
FIG. 10 is a view of a sequence of a drilling operation.
Figure 11:
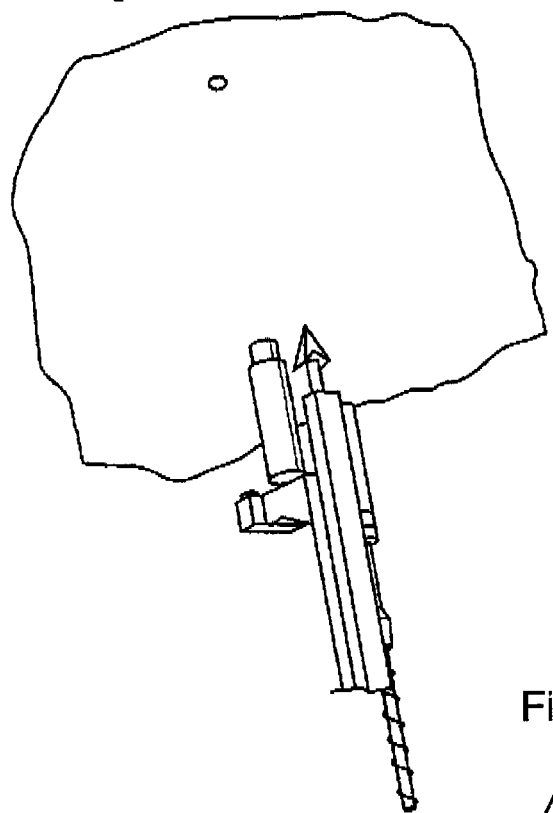
FIG. 11 is a view of a sequence of an explosive insertion operation.
Figure 12:
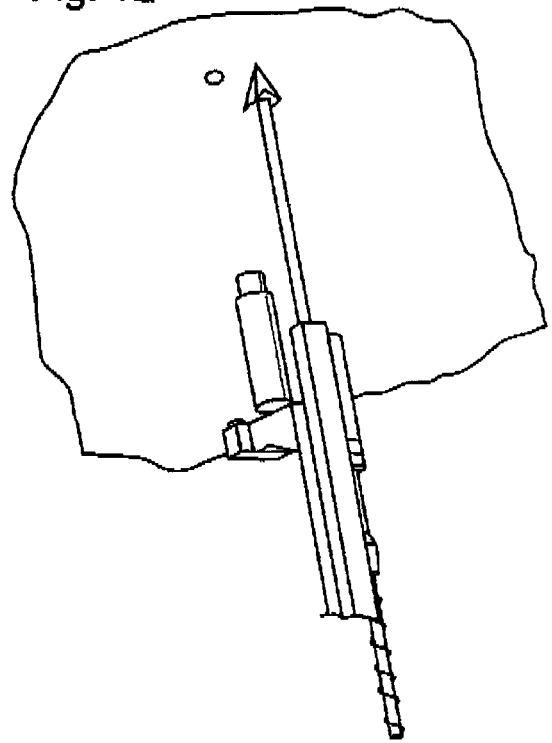
FIG. 12 is a view of a sequence of an explosive insertion operation.
Figure 13:
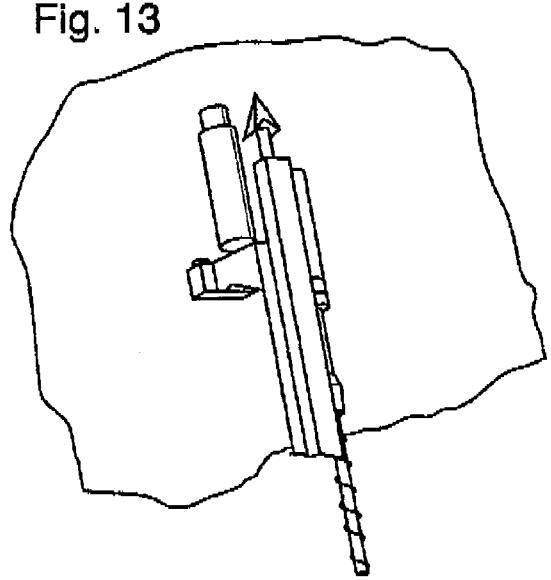
FIG. 13 is a view of a sequence of an explosive insertion operation.
Figure 14:
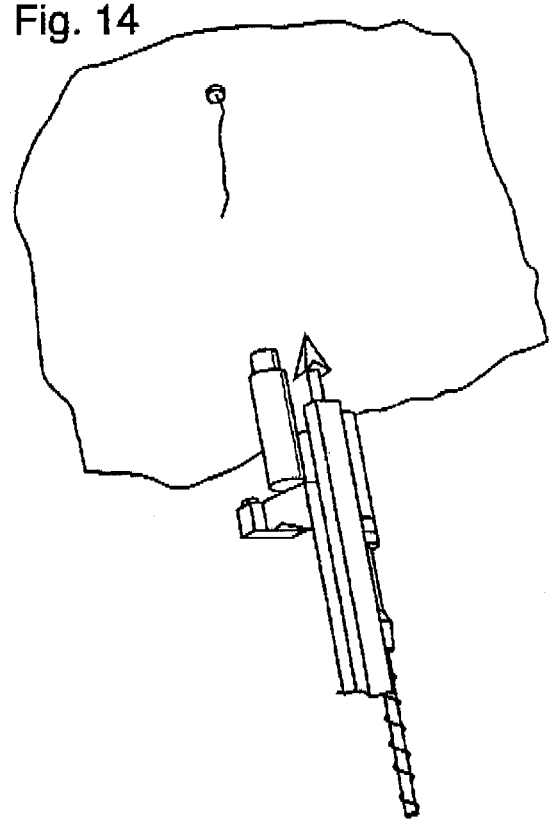
FIG. 14 is a view of a sequence of an explosive insertion operation.

Referring to FIG. 6, in position at the hang-up 400, an effector stinger 272, assists in stabilising the robotic arm 250 at the rock face.

FIGS. 7-14 illustrate a drilling and explosive implantation sequence. In the sequence, the drill is located at an intended location after the assessment described above. The stinger 272 is engaged with the rock face to stabilise the drilling process. The drill may then be retracted or rotated out of the way, and an explosive charge inserted into the drilled hole. A lead, shown truncated in FIG. 14, leads back to the robotic vehicle 200 for controlling the blast after withdrawing from the hang-up zone.

It should be understood that steps and the order of the steps in the processing described herein may be altered, modified and/or augmented and still achieve the desired outcome. Throughout the specification, terms such as "may" and "can" are used interchangeably and use of any particular term should not be construed as limiting the scope or requiring experimentation to implement the claimed subject matter or embodiments described herein. Further, the various features and adaptations described in respect of one example or embodiment in this disclosure can be used with other examples or embodiments described herein, as would be understood by the person skilled in the art.

A portion of the disclosure of this patent document contains material which is or may be subject to one or more of copyright, design patent, industrial design, or unregistered design protection. The rights holder has no objection to the reproduction of any such material as portrayed herein through facsimile reproduction of the patent document or patent disclosure, as it appears in the Patent and Trademark Office patent file or records, but otherwise reserves all rights whatsoever.

The invention claimed is:

1. A system for relieving a hang-up in a subsurface mine comprising:
    a mobile command vehicle comprising a mobile command vehicle computer and a control console for an operator to remotely operate a robotic vehicle by tele-operation over a communications network to park at a first position proximate to a hang-up location,
    the robotic vehicle comprising:
        a transceiver to receive control data from the mobile command vehicle over the communications network, and transmit positional data to the mobile command vehicle,
        a three dimensional scanner to scan the hang-up location and generate scanned data for transmission to the mobile command vehicle over the communications network and for the mobile command vehicle to return a target location for drilling and explosive insertion into at least one rock of the hang-up,
        a robotic arm with one or more end effectors, the robotic arm extendable to position the one or more end effectors proximate to the target location for the one or more end effectors to drill an explosives hole into the at least one rock at the target location and insert an explosive into the explosives hole,
        the robotic arm being retractable for the robotic vehicle to be tele-operated to a protected location prior to detonation of the explosive,
    wherein the robotic vehicle is operative to be repositioned from the first position to a second position for the robotic arm to extend the one or more end effectors to the target location.

2. The system of claim 1, wherein the mobile command vehicle is operative to transport the robotic vehicle to a first protected location within a communications network enabled distance from a hang-up location, the mobile command vehicle comprising a transceiver to transmit control data over the communications network and receive robotic vehicle positional data.

3. The system of claim 1, wherein the target location is determined by comparison between the scanned data for the hang-up and a database of hang-up removal scenarios.

4. The system of claim 3, wherein a geospatial location of the second position is determined based on a geospatial location of the target location relative to the first position.

5. The system of claim 1, wherein the robotic vehicle further comprises at least one stinger to stabilize the robotic vehicle against a first rock surface below the robotic vehicle and at least one stinger to stabilize the robotic vehicle against a second rock surface above the robotic vehicle.

6. The system of claim 5, wherein the robotic arm further comprises at least one stinger to stabilize the one or more end effectors against a third rock surface while drilling the explosives hole, and insertion of the explosive into the explosives hole.

7. A system for relieving a hang-up in a subsurface mine comprising:
    a mobile command vehicle comprising a mobile command vehicle computer and a control console for an operator to remotely operate a robotic vehicle by tele-operation over a communications network to park at a first position proximate to the hang-up location,
    the robotic vehicle comprising:
        a transceiver to receive control data from the mobile command vehicle over the communications network, and transmit positional data to the mobile command vehicle,
        a three dimensional scanner to scan the hang-up location and generate scanned data geo-spatially referenced relative to the first position for transmission to the mobile command vehicle over the communications network and for the mobile command vehicle to return a target location geo-spatially referenced relative to the first position for drilling and explosive insertion into at least one rock of the hang-up,
        a robotic arm with one or more end effectors, the robotic arm extendable to position the one or more end effectors proximate to the target location for the one or more end effectors to drill an explosives hole into the at least one rock at the target location and insert an explosive into the explosives hole,
        the robotic arm being retractable for the robotic vehicle to be tele-operated to a protected location prior to detonation of the explosive,
    wherein the robotic vehicle is operative to be autonomously repositioned from the first position to a second position, the second position geo-spatially referenced relative to the first position, to allow the robotic arm to extend the one or more end effectors to the target location, the target location being determined by comparison between the scanned data for the hang-up and a database of hang-up removal scenarios.

8. The system of claim 7, wherein the mobile command vehicle is operative to transport the robotic vehicle to a first protected location within a communications network enabled distanced from a hang-up location, the mobile command vehicle comprising a transceiver to transmit control data over the communications network and receive robotic vehicle positional data.

9. The system of claim 7, wherein the robotic arm is extended and retracted autonomously based on a spatial relativity between the second position of the robotic vehicle and the target location.

10. The system of claim 7, wherein absolute coordinates are determined for the first position of the robotic vehicle using an onboard subsurface geospatial positioning system.

11. The system of claim 7, wherein the detonation of the explosive is triggered by a signal transmitted over the communications network.

12. The system of claim 7, wherein the robotic vehicle further comprises at least two stingers to stabilize the robotic vehicle against one or more rock surfaces prior to extension of the robotic arm.

13. The system of claim 12, wherein the robotic vehicle further comprises at least one stinger to stabilize the robotic vehicle against a rock surface below the robotic vehicle and at least one stinger to stabilize the robotic vehicle against a rock surface above the robotic vehicle.

14. The system of claim 7, wherein the robotic arm further comprises at least one stinger to stabilize the robotic arm against a rock surface.

15. The system of claim 7, wherein the robotic arm further comprises at least one stinger to stabilize the one or more end effectors against a rock surface prior to drilling the explosives hole.

16. The system of claim 15, wherein the at least one stinger is configured to remain engaged with the rock surface while drilling the explosives hole and insertion of the explosive into the explosives hole.

17. A method for relieving a hang-up in a subsurface mine using a mobile command vehicle and a robotic vehicle comprising:
tele-operating the robotic vehicle into the first position proximate to a hang-up location using a tele-operation interface onboard the mobile command vehicle in a first protected location within a communications network enabled distance from the hang-up location,
scanning the hang-up location and generating scanned data geo-spatially referenced relative to the first position,
transmitting over the communications network the scanned data to the mobile command vehicle, the mobile command vehicle comprising an onboard computer,
extending a robotic arm with at least one end effector for drilling an explosives hole and a second end effector for inserting an explosive based on a geo-spatially referenced target location transmitted over the communications network from the mobile command vehicle based on the scanned data, and
retracting the robotic arm after inserting the explosives and tele-operating the robotic vehicle to a second protected location prior to detonation of the explosive.

18. The method of claim 17, further comprising determining the geo-spatially referenced target location by comparison between the scanned data for the hang-up and a database of hang-up removal scenarios, and repositioning the robotic vehicle into a geo-spatially referenced second position proximate to a hang-up location.

19. The new method of claim 18, wherein the repositioning is done autonomously.

20. The method of claim 17, wherein the robotic arm is extended autonomously to the geo-spatially referenced target location.

* * * * *